(12) United States Patent  
Breen et al.

(10) Patent No.: US 8,733,147 B2  
(45) Date of Patent: May 27, 2014

(54) GAS SPRING MOUNTING ASSEMBLY AND METHOD FOR METAL FORMING DIES

(75) Inventors: Scott M. Breen, Marne, MI (US); Joel T. Pyper, Grand Rapids, MI (US)

(73) Assignee: Standard Lifters, Inc., Grand Rapids, MI (US)

( * ) Notice: Subject to any disclaimer, the term of this patent is extended or adjusted under 35 U.S.C. 154(b) by 327 days.

(21) Appl. No.: 13/331,276

(22) Filed: Dec. 20, 2011

(65) Prior Publication Data

US 2012/0151984 A1    Jun. 21, 2012

Related U.S. Application Data

(60) Provisional application No. 61/425,376, filed on Dec. 21, 2010.

(51) Int. Cl.
```
B21D 43/05      (2006.01)
B21D 45/00      (2006.01)
B21J 9/18       (2006.01)
```
(52) U.S. Cl.  
USPC ..... 72/481.6; 72/481.1; 72/481.9; 72/453.13; 72/462; 29/428; 83/588

(58) Field of Classification Search  
USPC ......... 72/361, 393, 405.01, 405.06, 420, 421, 72/453.13, 462, 470, 481.1, 481.6, 481.9; 29/428; 403/299; 83/588  
See application file for complete search history.

(56) References Cited

U.S. PATENT DOCUMENTS

| | | | |
|---|---|---|---|
| 4,055,353 A | 10/1977 | Bieri | |
| 4,282,736 A * | 8/1981 | Mashburn | 72/345 |
| 6,848,290 B2 | 2/2005 | Pyper et al. | |
| 7,024,910 B2 | 4/2006 | Pyper et al. | |
| 7,152,451 B1 | 12/2006 | Cotter | |
| 8,146,399 B2 | 4/2012 | Pyper et al. | |
| 8,522,595 B2 * | 9/2013 | Pyper et al. | 72/481.1 |
| 2009/0193951 A1 * | 8/2009 | Pyper et al. | 72/405.01 |
| 2012/0151984 A1 * | 6/2012 | Breen et al. | 72/462 |
| 2012/0151985 A1 * | 6/2012 | Breen et al. | 72/470 |

OTHER PUBLICATIONS

Standard Lifters Inc., "Why Use Gas Spring Clamps," complete brochure, publication Apr. 2012 (rev. 3), 12 pages total, Grand Rapids, Michigan USA—see pp. 5, 8 and 9.

* cited by examiner

Primary Examiner — David B Jones  
(74) Attorney, Agent, or Firm — Price Heneveld LLP

(57) ABSTRACT

A gas spring mount and related method for metal forming dies includes a one-piece, generally U-shaped clamping band with an arcuate medial portion shaped to receive an associated gas spring body therein, and two enlarged ends with through apertures. Threaded mounting screws extend through the through apertures in the clamping band ends, and are anchored into threaded retainer holes in an associated die member. At least one of the mounting screws has a tapered head and is disposed laterally offset from the associated threaded retainer hole in the die, whereby tightening of the one screw shifts the related enlarged end of the mounting band laterally toward the opposite enlarged end to pull the clamping band constrictingly against the gas spring body to securely, yet detachably retain the same therein.

33 Claims, 10 Drawing Sheets

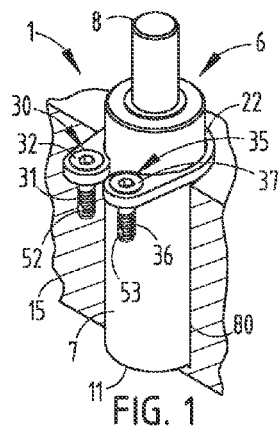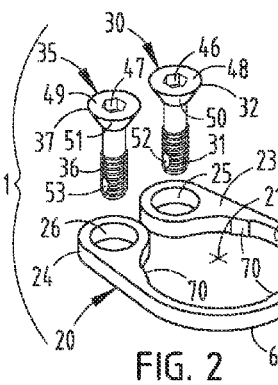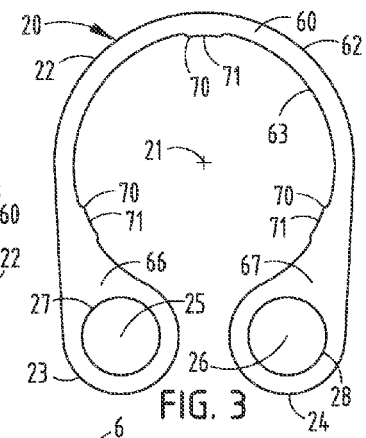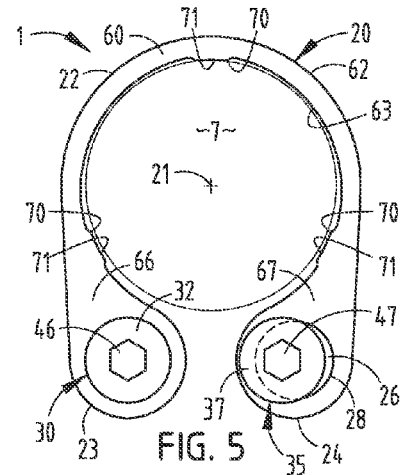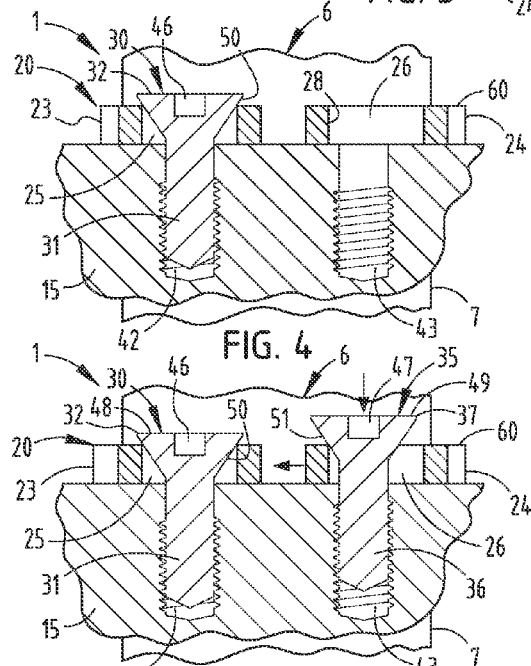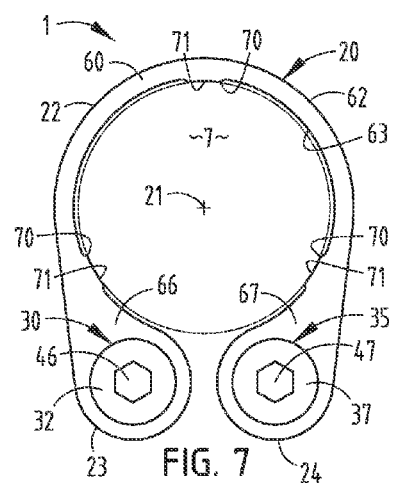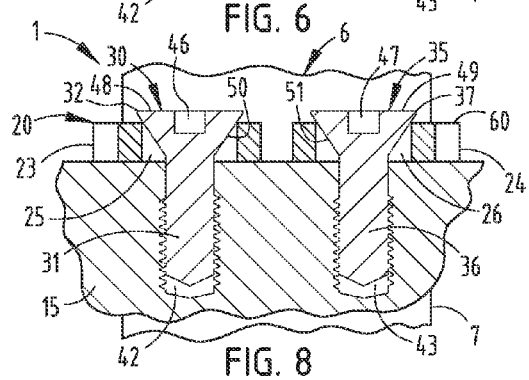

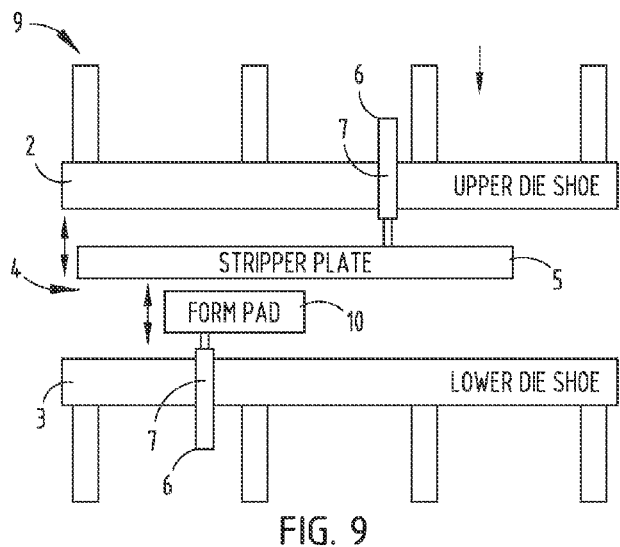
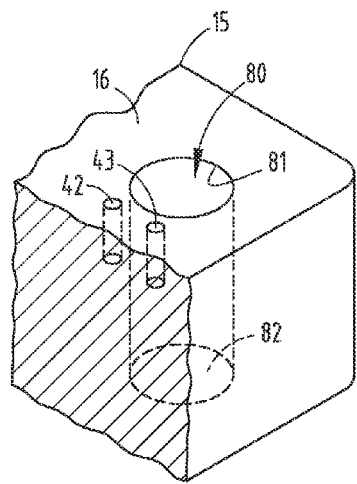
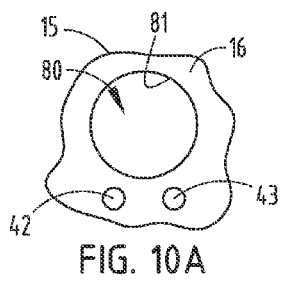
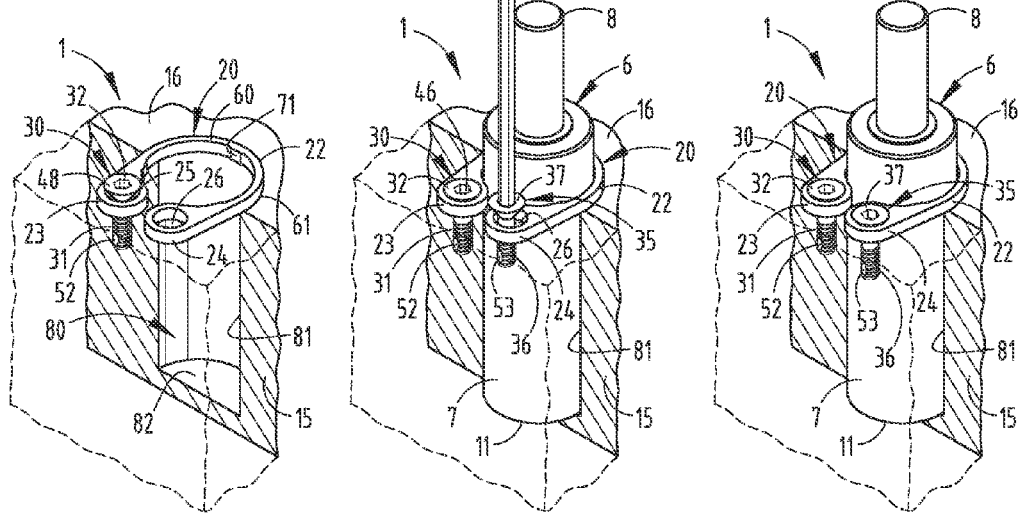
FIG. 9   FIG. 10
FIG. 10A
FIG. 11   FIG. 12   FIG. 13

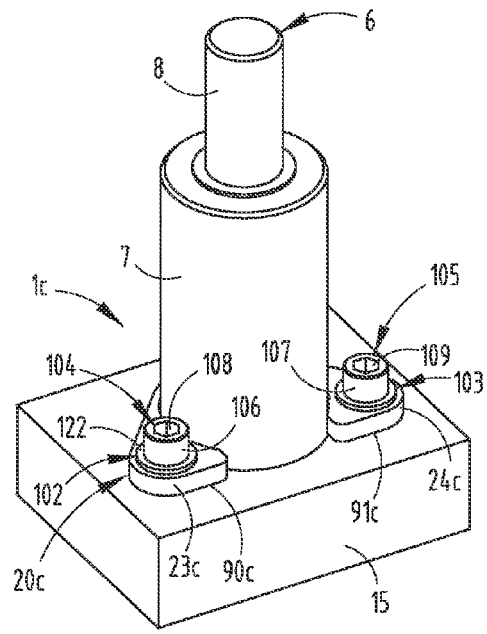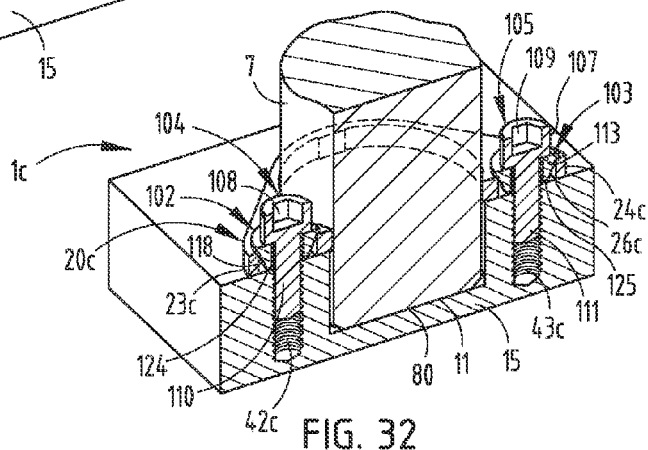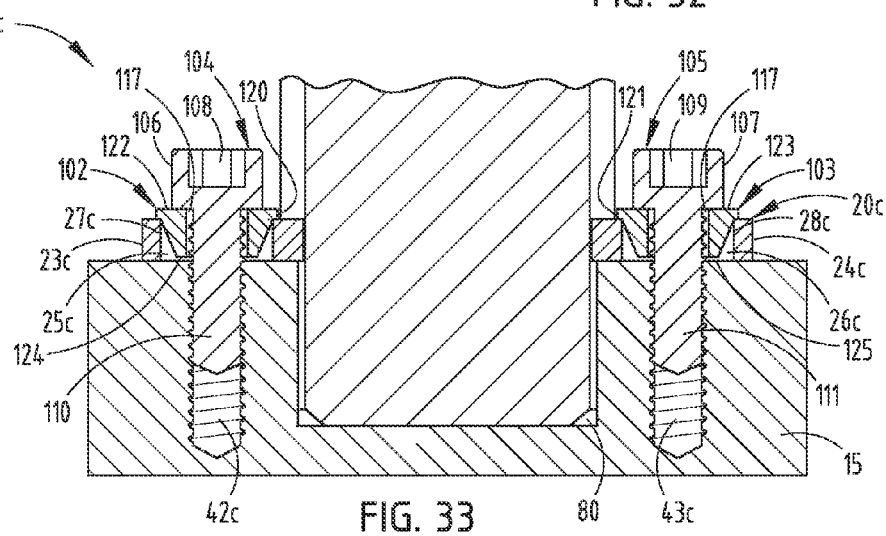

GAS SPRING MOUNTING ASSEMBLY AND METHOD FOR METAL FORMING DIES

CROSS REFERENCE TO RELATED APPLICATION AND CLAIM TO PRIORITY

The present application is related to commonly assigned, co-pending U.S. patent application Ser. No. 13/331,167, filed even date herewith, entitled GAS SPRING MOUNTING ASSEMBLY AND METHOD FOR METAL FORMING DIES, which is hereby incorporated herein by reference.

Applicants hereby claim the priority benefits under the provisions of 35 U.S.C. §119, basing said claim of priority on related Provisional Patent Application Ser. No. 61/425,376, filed Dec. 21, 2010.

BACKGROUND OF THE INVENTION

The present invention relates to metal forming dies the like, and in particular to a gas spring mounting assembly and associated method.

Metal forming dies, such as stamping dies and the like, are well known in the art. Progressive metal forming dies are unique, very sophisticated mechanisms which have multiple stations or progressions that are aligned longitudinally, and are designed to perform a specified operation at each station in a predetermined sequence to create a finished metal part. Progressive stamping dies are capable of forming complex metal parts at very high speeds so as to minimize manufacturing costs.

Heretofore, the dies used in metal forming presses have typically been individually designed, one of a kind assemblies for a particular part, with each of the various components being hand crafted and custom mounted or fitted in an associated die set, which is in turn positioned in a stamping press. Not only are the punches and the other forming tools in the die set individually designed and constructed, but the other parts or components of the die set, such as stock lifters, guides, end caps and keepers, cam returns, etc. are also custom designed, and installed in the die set. Current die making processes require carefully machined, precision holes, and recesses in the die set for mounting the individual components, such that the same are quite labor intensive, and require substantial lead time to make, test and set up in a stamping press.

Metal forming dies typically include an upper die shoe and a lower die shoe which are interconnected by guides and keepers for selected mutual reciprocation. Most modern metal forming dies also include a number of die components, such as stripper pads, forming pads, stock lifters, and the like, which are positioned in between the upper and lower die shoes and travel independently of the same as the die shoes converge and diverge during each stroke of the press. These die components perform a number of different functions, such as selectively applying pressure to certain areas of the stock strip to hold the same in place, creating forms or shapes in the stock strip, etc. Self-contained spring devices, such as coil springs, gas springs and the like are generally used to automatically shift these die components relative to one another and/or the two die shoes. Heretofore, spring devices have been mounted in the various die components and/or die shoes using custom fitting techniques that require time consuming, accurate machining, which increases the overall cost and complexity of the metal forming die. Precision holes and recesses must be carefully machined in the various die members to individually retain the various die components. While such prior art constructions are generally effective, they are complicated and expensive. A modular gas spring retainer and associated method which securely retains the gas springs on the various die components during assembly and maintenance of the tool during production, and prevents the same from inadvertently falling into the die during part production, would be clearly advantageous in simplifying metal forming die constructions and reducing the overall cost of designing, manufacturing and repairing metal forming dies.

SUMMARY OF THE INVENTION

One aspect of the present invention is a metal forming die of the type having at least one gas spring mounted between first and second reciprocating die members, which includes an improved gas spring retainer assembly. The gas spring retainer assembly comprises a one-piece, clamping band having a generally U-shaped plan configuration with a central axis of symmetry. The clamping band is defined by a generally arcuate medial portion that is disposed generally about the central axis of symmetry, shaped to receive a body portion of the gas spring therein, and configured for resilient shifting between clamped and unclamped conditions. The clamping band also includes first and second enlarged end portions, having associated first and second through apertures oriented generally parallel with the central axis of symmetry and defined by side walls shaped to receive associated fasteners therein for attaching the clamping band to the first die member. The gas spring retainer assembly also includes a first mounting screw having a threaded shank portion extending through the first through aperture in the clamping band and anchored in the first die member, and an enlarged head portion engaging the first enlarged end portion of the clamping band in the clamped condition. The gas spring retainer assembly also includes a second mounting screw having a threaded shank portion extending through the second through aperture in the clamping band and anchored in the first die member, and a tapered head portion with at least a portion thereof having an outside diameter that is greater than the second through aperture in the clamping band. The gas spring retainer assembly also includes a first threaded retainer aperture in the first die member disposed concentric with the first through aperture in the clamping band and anchoring the shank portion of the first mounting screw therein, whereby tightening of the first mounting screw securely mounts the first enlarged end portion of the clamping band on the first die member. The gas spring retainer assembly also includes a second threaded retainer aperture in the first die member disposed in the unclamped condition laterally offset from the second through aperture in the clamping band and anchoring the shank portion of the second mounting screw therein, whereby tightening of the second mounting screw engages the tapered head portion of the second mounting screw against the side wall of the second through aperture and shifts the second enlarged end portion of the clamping band laterally toward the first enlarged end portion of the clamping band, thereby pulling the medial portion of the clamping band constrictingly against the gas spring body to securely, yet detachably, retain the gas spring on the first die member in the clamped condition.

Another aspect of the present invention is a retainer assembly for mounting gas springs in metal forming dies, comprising a one-piece, clamping band having a generally U-shaped plan configuration with a central axis of symmetry. The clamping band is defined by a generally arcuate medial portion disposed generally about the central axis of symmetry, that is shaped to receive a body portion of the gas spring therein, and is configured for resiliently shifting between clamped and unclamped conditions. The clamping band also includes first and second enlarged end portions, having associated first and second through apertures oriented generally parallel with the central axis of symmetry and defined by a sidewall shaped to receive associated fasteners therein for attaching the clamping band to the first die member. The retainer assembly also includes a first mounting screw having a threaded shank portion extending through the first through aperture in the clamping band and anchored in the first die member, and an enlarged head portion engaging the first enlarged end portion of the clamping band in the clamped condition. The retainer assembly also includes a second mounting screw having a threaded shank portion extending through the second through aperture in the clamping band and anchored in the first die member, and a tapered head portion with at least a portion thereof having an outside diameter that is greater than the second through aperture in the clamping band. The first through aperture in the clamping band is configured to be disposed in a concentric relationship with a first threaded retainer aperture in the first die member in which the shank portion of the first mounting screw is anchored, whereby tightening of the first mounting screw securely mounts the first enlarged end portion of the clamping band on the first die member. The second through aperture in the clamping band is configured when in the unclamped condition to be disposed in a laterally offset relationship with a second threaded retainer aperture in the first die member in which the shank portion of the second mounting screw is anchored, whereby tightening of the second mounting screw engages the tapered head portion of the second mounting screw against the sidewall of the second through aperture and shifts the second enlarged end portion of the clamping band laterally toward the first enlarged end portion of the clamping band, thereby pulling the medial portion of the clamping band constrictingly against the gas spring body to securely, yet detachably, retain the gas spring on the first die member in the clamped condition.

Yet another aspect of the present invention is a method for making metal forming dies of the type having at least one gas spring mounted between first and second reciprocating die members. The method includes forming a blind hole pocket in the first die member with a sidewall shaped for close reception of the body portion of the gas spring therein, and a bottom on which an end portion of the gas spring is abuttingly supported. The method further includes forming a one-piece, clamping band having a generally U-shaped plan configuration with a central axis of symmetry, and a generally arcuate medial portion disposed generally about the central axis of symmetry, that is shaped to receive the body portion of the gas spring therein, and is configured for resilient shifting between clamped and unclamped conditions, as well as first and second enlarged end portions, having associated first and second through apertures located generally parallel with the central axis of symmetry, and defined by sidewalls shaped to receive associated fasteners therein for attaching the clamping band to the first die member. The method further includes providing a first mounting screw with a threaded shank portion for extending through the first through aperture in the clamping band and anchoring in the first die member, and an enlarged head portion for engaging the first enlarged end portion of the clamping band in the clamped condition. The method also includes providing a second mounting screw with a threaded shank portion for extending through the second through aperture in the clamping band and anchoring in the first die member, and a tapered end portion with at least a portion thereof having an outside diameter that is greater than the second through aperture in the clamping band. The method also includes forming a first threaded retainer aperture in the first die member at a location thereon concentric with the first through aperture in the clamping band, and forming a second threaded retainer aperture in the first die member at a location thereon, which in the unclamped condition, is laterally offset from the second through aperture in the clamping band. The method also includes positioning the clamping band on the first die member with the medial portion thereof disposed generally over the blind hole pocket, and the first through aperture disposed generally over the first threaded retainer aperture in the first die member. The method further includes inserting the first mounting screw through the first through aperture in the clamping band and into the first threaded retainer aperture in the first die member, and rotating the same to a generally tightened condition. The method also includes inserting the body portion of the gas spring through the medial portion of the clamping band, and into the blind hole pocket in the first die member. The method further includes inserting the second mounting screw through the second through aperture in the clamping band and into the second threaded retainer aperture in the first die member, and rotating the same to a loosely retained condition. Finally, the method includes tightening the second mounting screw in the second threaded retainer aperture in the first die member, thereby engaging the tapered head portion of the second mounting screw against the sidewall of the second through aperture, thereby shifting the second enlarged end portion of the clamping band laterally toward the first enlarged end portion of the clamping band and pulling the medial portion of the clamping band constrictingly against the gas spring body to securely, yet detachably, retain the gas spring on the first die member in the clamped condition.

Yet another aspect of the present invention is a metal forming die of the type having at least one gas spring mounted between first and second reciprocating die members, which includes an improved gas spring retainer assembly. The gas spring retainer assembly includes a one-piece, clamping band having a generally U-shaped plan configuration with a central axis of symmetry. The clamping band is defined by a generally arcuate medial portion disposed generally about the central axis of symmetry, is shaped to receive a body portion of said gas spring therein, and is configured for resilient shifting between clamped and unclamped conditions. The clamping band also includes first and second enlarged end portions, having associated first and second through apertures oriented generally parallel with the central axis of symmetry and defined by first and second sidewalls shaped for attaching the clamping band to said first die member. The gas spring retainer assembly also includes first and second mounting screws, each having a threaded shank portion extending through an associated one the first and second through apertures in the clamping band and anchored in the first die member, and an enlarged head portion. The gas spring retainer assembly also includes first and second tapered plugs, each having central aperture in which the shank portion of an associated one of the first and second mounting screws is retained, and a tapered exterior wall with at least a portion thereof having an outside diameter that is equal to or greater than the diameter of the associated one of the first and second sidewalls of the first and second through apertures in the clamping band. The gas spring retainer assembly also includes first and second threaded retainer apertures in the first die member which are disposed in the unclamped condition, in a laterally offset relationship with the associated one of the first and second through apertures in the clamping band, and anchor the shank portions of the said first and second mounting screws, whereby tightening of the first and second mounting screws engages the enlarged head portions of the first and second mounting screws against the first and second tapered plugs and draws the tapered plugs toward the first die member, which in turn engages the tapered exterior walls of the first and second tapered plugs against the first and second sidewalls of the first and second through apertures in the clamping band and shifts the first and second enlarged end portions of the clamping band laterally toward one another, thereby pulling the medial portion of said clamping band constrictingly against the gas spring body to securely, yet detachably retain the gas spring on the first die member.

Yet another aspect of the present invention is a gas spring mounting assembly and method for metal forming dies, which securely retains gas springs and other similar die reaction components during both the assembly and maintenance of the metal forming die, and also prevents the gas springs from falling into the die during the production of die formed metal parts. The gas spring mounting assembly and method require only simple machining of the die members and/or components, and use circumferential clamping about the body portion of the gas spring, which makes abutting contact at multiple locations about the outside surface of the gas spring to provide greater holding strengths, which simultaneously centers the gas spring in the center of the blind hole pocket in the die member. The gas spring mounting assembly and method are compatible with a wide variety of differently shaped and sized gas springs, and can be installed anywhere along the length of the gas spring, without requiring special grooves or other retention features on the gas spring body for attachment. The gas spring mounting assembly and method permits the gas spring to be easily installed and removed from an associated die member or component. The gas spring mounting assembly and method provides a pre-made, modular retainer with an uncomplicated construction that avoids the need for expensive custom, in-house fabrication, which reduces machining costs, is easy to assemble, and securely retains the gas spring in place with a minimal footprint and profile to facilitate installation in a wide variety of locations in the metal forming die. The gas spring mounting assembly preferably includes a standardized clamping band design that can be provided in a wide variety of different diameters to accommodate different shapes and sizes of gas springs. The uniquely shaped one-piece clamping band is adapted to be economically manufactured by cutting the same from solid plates of metal or the like, preferably arranged in a nested layout, such that the parts can be simply deburred and surface treated and do not require any additional machine processes, so as to reduce manufacturing time and cost. Laser and/or abrasive water cutting techniques may be used to economically manufacture the clamping bands, and produce consistently shaped parts. The gas spring mounting assembly and method is efficient in use, economical to manufacture, capable of a long operating life and particularly well adapted for the proposed use.

These and other advantages of the invention will be further understood and appreciated by those skilled in the art by reference to the following written specification, claims, and appended drawings.

BRIEF DESCRIPTION OF THE DRAWINGS

FIG. 1 is a perspective view of a gas spring retainer assembly embodying the present invention, shown installed in an associated die member.

FIG. 2 is an exploded perspective view of the gas spring retainer assembly.

FIG. 3 is a plan view of a clamping band portion of the gas spring retainer assembly, shown in a relaxed condition.

FIG. 4 is a cross-sectional view of the gas spring retainer assembly of FIGS. 1-3, shown with a first mounting screw installed tightly in the clamping band, which is still in the relaxed condition, along with an associated gas spring and die member.

FIG. 5 is a plan view of the clamping band of FIGS. 1-4 with a second mounting screw installed loosely in the clamping band, which is still in the relaxed condition about an associated gas spring body that is illustrated schematically.

FIG. 6 is a cross-sectional view of the gas spring retainer assembly of FIGS. 1-5, shown with the second mounting screw loosely installed in the clamping band, along with an associated gas spring and die member.

FIG. 7 is a plan view of the gas spring retainer assembly of FIGS. 1-6, with both mounting screws installed tightly in the clamping band, which is shifted to a fully clamped condition about a gas spring body that is illustrated schematically.

FIG. 8 is a cross-sectional view of the gas spring retainer assembly of FIGS. 1-7, shown in the fully clamped condition, along with an associated gas spring and die member.

FIG. 9 is a schematic, side elevational view of a metal forming die of the type in which the gas spring retainer assembly is used.

FIG. 10 is a fragmentary cross-sectional view of the die member in which a blind hole pocket and associated threaded retainer apertures have been formed for mounting a gas spring therein using the gas spring retainer assembly of FIGS. 1-9.

FIG. 10A is a fragmentary top plan view of the die member with blind hole pocket and associated threaded retainer apertures shown in FIG. 10.

FIG. 11 is a fragmentary cross-sectional view of the die member of FIGS. 10-10A, wherein the gas spring retainer assembly is shown partially assembled on the die member in the relaxed condition using a first mounting screw.

FIG. 12 is a fragmentary cross-sectional view of the die member of FIGS. 9-11, wherein a gas spring is shown inserted through the clamping band and into the blind hole pocket with a second screw loosely engaged in the die member for final installation using an associated tool.

FIG. 13 is a fragmentary cross-sectional view of the die member of FIGS. 9-12, wherein the second mounting screw is tightening in the die member to shift the clamping band to the fully clamped condition.

FIG. 31 is a perspective view of the gas spring retainer assembly of FIGS. 27-30, shown in a fully installed, clamped condition in an associated die member, along with a gas spring retained therein.

FIG. 32 is a perspective cross-sectional view of the gas spring retainer assembly of FIGS. 27-32, shown in the fully installed, clamped condition of FIG. 31, along with a portion of a gas spring retained therein.

FIG. 33 is a cross-sectional view of the gas spring retainer assembly of FIGS. 27-32, shown in the fully installed, clamped condition of FIGS. 31 and 32, along with the a portion of a gas spring retained therein.

DETAILED DESCRIPTION OF THE PREFERRED EMBODIMENTS

Figure 14:
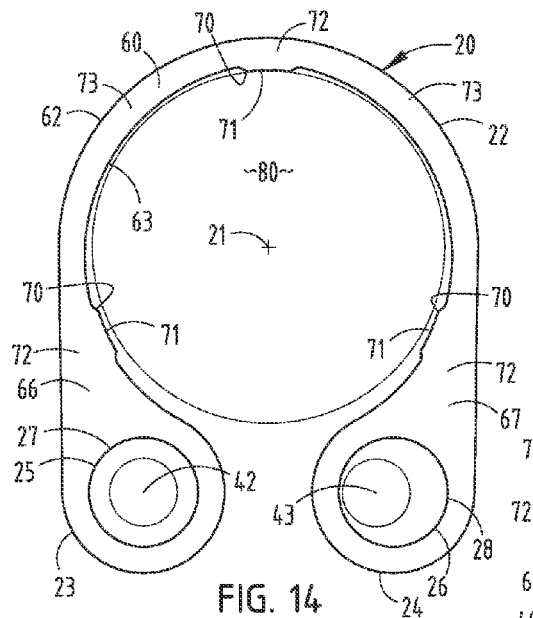
FIG. 14 is an enlarged plan view of the clamping band of FIGS. 1-13, shown overlying the pocket and two threaded retention apertures in the die member, which is in the relaxed condition.
Figure 15:
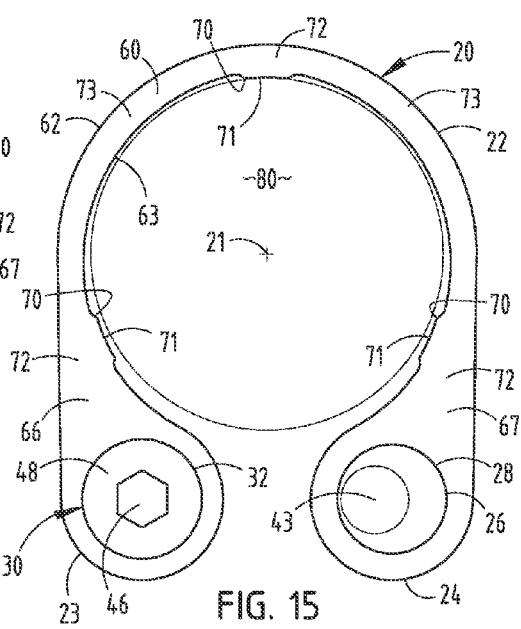
FIG. 15 is an enlarged plan view of the clamping band of FIG. 14, shown with a first mounting screw installed in the first through aperture in the first enlarged end portion of the clamping band, which is in the relaxed condition.

For purposes of description herein, the terms "upper," "lower," "right," "left," "rear," "front," "vertical," "horizontal" and derivatives thereof shall relate to the invention as oriented in FIGS. 1-8. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIGS. 1-7) generally designates a gas spring retainer assembly embodying the present invention. Gas spring retainer assembly 1 is particularly adapted for use in conjunction with metal forming dies of the type illustrated in FIG. 9, having an upper die shoe 2, a lower die shoe 3, and a plurality of other die components 4 mounted between upper die shoe 2 and lower die shoe 3. In the example illustrated in FIG. 9, these die components 4 include a stripper plate 5, which is operably supported on upper die shoe 2 and reciprocates relative to upper die shoe 2. A first gas spring 6, or other similar biasing mechanism, is positioned operably between upper die shoe 2 and stripper plate 5, with the body portion 7 connected to upper die shoe 2 and the rod portion 8 connected to stripper plate 5, and is configured resiliently to urge stripper plate 5 outwardly to a normally diverged position relative to upper die shoe 2. Stripper plate 5 typically serves the purpose of shifting the strip of stock away from the metal forming components of the die or die set 9. In the example illustrated in FIG. 9, die components 4 also include a forming pad 7, which is operably connected with lower die shoe 3 and reciprocates relative to lower die shoe 3. A second gas spring 6, or other similar biasing mechanism, is positioned operably between forming pad 10 and lower die shoe 3, with the body portion 7 connected to lower die shoe 3, and the rod portion 6 connected to forming pad 10, and is configured to resiliently urge forming pad 7 into a normally diverged position relative to lower die shoe 2. As is well known in the metal forming art, the complete die or die set 9, comprising upper die shoe 2, lower die shoe 3 and other die components 4, is mounted in an associated stamping press (not shown). The ram portion of the stamping press strokes the upper die shoe 2, and other die components 4 supported thereon, upwardly and downwardly, while the lower die shoe, and other die components 4 supported thereon, remains stationary. At least portions of many of the die components 4 travel independently of the upper and lower die shoes 2, 3 as the upper and lower die shoes converge and diverge, such as the stripper plate 5 and forming pad 10 shown in FIG. 8. In general, the die components 4 perform a number of different functions, such as applying pressure to the metal stock and creating forms in the metal stock. The gas springs 6, or other similar biasing devices, are used to create the pressure between the die shoes 2, 3 and traveling die components 4. Heretofore, the gas springs 6 and/or other similar biasing devices have typically been mounted or otherwise secured to the associated die shoes 2, 3, or other die components 4 using a variety of different fastening systems, including a catch tab, urethane disc, flanges and the like, which while generally effective, are time consuming and costly to individually fabricate and install for each gas spring in the die set 9.

The present gas spring retainer assembly 1 includes a one-piece, clamping band 20 having a generally U-shaped plan configuration with a central axis of symmetry 21. Clamping band 20 is defined by a generally arcuate medial portion 22 that is disposed generally about the central axis of symmetry 21, is shaped to receive the body portion 7 of an associated gas spring 6 therein, and is configured for resilient shifting between the clamped condition shown in FIGS. 1, 7 and 8, and the unclamped or relaxed condition shown in FIGS. 2-6.

Clamping band 20 also includes first and second enlarged end portions 23 and 24, respectively, having associated first and second through apertures 25 and 26 oriented generally parallel with the central axis of symmetry 21 and defined by first and second sidewalls 27 and 28, which are shaped to receive fasteners therein for attaching clamping band 20 to an associated die member 15. Gas spring retention assembly 1 also includes a first mounting screw 30 having a threaded shank portion 31 extending through the first through aperture 25 in clamping band 20 and anchored in the die member 15, and an enlarged head portion 32 engaging the first enlarged end portion 23 of clamping band 20 in the clamped condition shown in FIGS. 1, 7 and 8. Gas spring retention assembly 1 also includes a second mounting screw 35 having a threaded shank portion 36 extending through the second through aperture 26 in the clamping band 20 and anchored in the die member 15, and a tapered head portion 37 with at least a portion thereof having an outside diameter that is greater than the inside diameter of the second through aperture 26 in clamping band 20. The gas spring retainer assembly 1 also includes a first threaded retainer aperture 42 (FIGS. 5 and 6) in the associated die member 15, which in the example shown in FIGS. 4 and 5, is disposed generally concentric with the first through aperture 25 in clamping band 20 when the first mounting screw 30 is tightened, and anchors the shank portion 30 of the first mounting screw 29 therein, whereby tightening of the first mounting screw 29 accurately centers the first through aperture 25 over the first threaded retainer aperture 42, and securely mounts the first enlarged end portion 23 of clamping band 20 on the die member 15. The gas spring retainer assembly 1 also includes a second threaded retainer aperture 43 in the associated die member 15, which in the example show in FIGS. 4 and 5, and with the clamping band 20 in the unclamped condition, is disposed generally eccentric or laterally offset from the second through aperture 26 in clamping band 20, and anchors the shank portion 36 of the second mounting screw 35 therein, whereby tightening of the second mounting screw 35 engages the tapered head portion 37 of the second mounting screw 35 against the sidewall 28 of the second through aperture 26 and shifts the second enlarged end portion 24 of the clamping band 20 laterally toward the first enlarged end portion 23 of the clamping band 20, thereby pulling the medial portion 22 of the clamping band 20 constrictingly against the gas spring body 7, as illustrated by the arrows in FIGS. 5-7, to securely, yet detachably, retain the gas spring 6 on the associated die member 15 in the clamped condition.

The gas spring retainer assembly illustrated in FIGS. 1-8 has the tapered head portion 37 of the second mounting screw 35 configured such that when the second mounting screw 35 is loosely retained in the associated die member 15, the clamping band 20 assumes the relaxed or unclamped condition shown in FIGS. 2-6, in which the gas spring body 7 can be freely inserted into and removed from the medial portion 22 of the clamping band 20, and when the second mounting screw 35 is tightly anchored in the die member 15, the clamping band 20 assumes the clamped condition shown in FIGS. 1, 7 and 8, in which the gas spring body 7 is securely retained in the medial portion 22 of the clamping band 20.

The head portion 32 of the illustrated first mounting screw 30 is also tapered, and serves to automatically center the first through aperture 25 in the first enlarged end 23 of clamping band 20 over the first threaded retainer aperture 42 in the die member 15 when the first mounting screw 30 is tightened. Preferably, the first mounting screw 30 and second mounting screw 35 have a substantially identical size and configuration, such that they are interchangeable in the gas spring retainer assembly 1. In one working embodiment of the present invention, the first and second mounting screws 30, 35 have a conventional construction, comprising flat head screws, with tool sockets 46, 47 formed in the circular outer flat ends 48, 49 of the screw heads 32, 37 and frustoconically shaped sidewalls 50, 51, which taper inwardly from the flat ends 48, 49 to the shank portions 31, 36 of the mounting screws 30, 35. The illustrated mounting screws 30, 35 also include self-locking nylon patches 52, 53, disposed on the outer surfaces of the threaded shank portions 31, 36, which serve to retain the mounting screws 30, 35 tight in the associated die member 15, at least when the clamping band 20 is in the clamped condition. The tapered heads 32, 37 of mounting screws 30, 35, in conjunction with the associated through apertures 24, 25 and enlarged ends 23, 24 of clamping band 20 provide a very compact, low profile gas spring retainer assembly 1 that facilitates efficient construction of the die set 9.

In the example illustrated in FIGS. 1-8, clamping band 20 has a solid metal construction, and is preferably made from steel or the like, which is strong and durable, yet has some elastic deformation that permits the clamping band 20 to resiliently shift between the relaxed condition (FIGS. 2-6) and the clamped condition (FIGS. 1, 7 and 8). The medial portion 22 of the illustrated clamping band 20 has a generally cylindrical or annular plan shape, wherein the sidewall thickness is selected to achieve the desired resilient flexure when constrictingly engaging the body portion 7 of an associated gas spring 6, yet achieve substantial resilient tensile strength for secure clamping around the associated gas spring body 7, and durability for repeated flexure between the clamped and unclamped conditions. The clamping band 20 illustrated in FIGS. 1-8 has the plan shape of a horseshoe, wherein the enlarged end portions 23 and 24 wrap around the gas spring body 7 and are positioned radially exterior thereto. In the clamped condition shown in FIGS. 1, 7 and 8, the side edge portions of the outer sidewall 62 of clamping band 20 taper inwardly toward the enlarged end portions 23 and 24 of clamping band 20.

As described in greater detail hereinafter, clamping band 20 is preferably cut from a flat plate of material that is resiliently deformable, such as metal or the like, and includes flat, mutually parallel, upper and lower faces 60 and 61, a generally ovate marginal outer sidewall surface 62, and a generally circular inner sidewall surface 63, both of which are disposed generally perpendicular to upper and lower faces 60 and 61. In the illustrated example, the enlarged end portions 23 and 24 of clamping band 20 have a substantially annular plan configuration, with through apertures 25, 26 disposed in central portions of the associated enlarged ends 23, 24. The annularly shaped medial portion 22 of clamping band 20 transitions to the enlarged ends 23, 24 thereof at arcuately tapered transition areas 66, 67 of clamping band 20.

Figure 16:
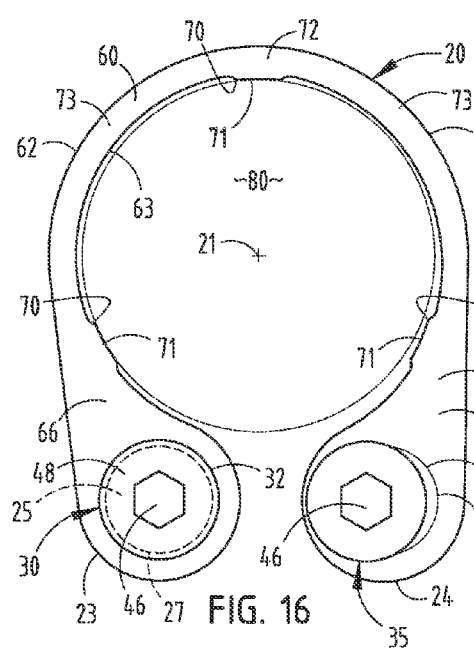
FIG. 16 is an enlarged plan view of the clamping band of FIG. 15 shown with the first mounting screw tightened, and the second mounting screw loosely engaged in the associated threaded retainer aperture.
Figure 17:
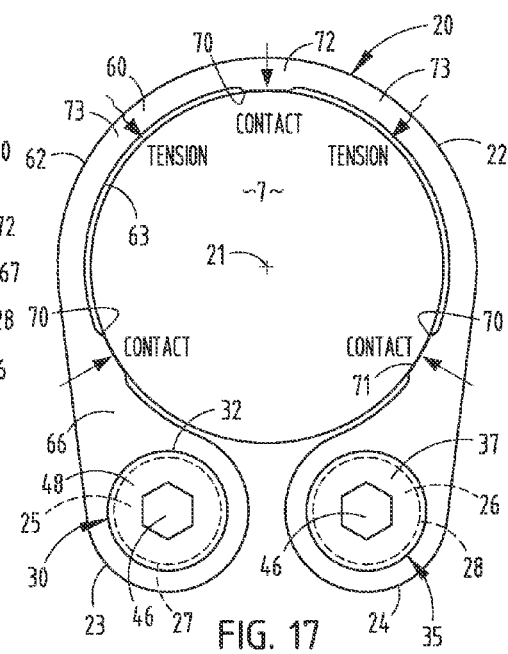
FIG. 17 is an enlarged plan view of the clamping band and mounting screw of FIG. 16, shown in the fully clamped condition about a gas spring body that is illustrated schematically.

The clamping band 20 illustrated in FIGS. 1-17 includes a plurality of radially inwardly protruding contact pads 70 which are spaced circumferentially apart along inner sidewall 63, and include arcuately shaped outer contact surfaces 71 that are configured to abut against the outside wall of gas spring body 7 in the manner illustrated in FIGS. 1, 7 and 17. In the illustrated example, clamping band 20 includes three contact pads 70, wherein each of the associated contact surfaces 71 has an angular measure of approximately 5-10 degrees. The center contact pad 70 is disposed mid-point on the marginal portion 22 of clamping band 20, and the remaining two contact pads 70 are spaced equally from the central contact pad with a mutual angular orientation in the range of 50-80°. In the unclamped condition, the opening defined in between the contact surfaces 71 of contact pads 70 has a circular configuration with a diameter that is slightly larger than the outside diameter of the body portion 7 of the gas spring 6 to be retained therein.

As best illustrated in FIGS. 5-8, the through apertures 25 and 26 in the enlarged ends 23, 24 of clamping band 20 are configured such that the contact between the tapered head portions 32, 37 of the mounting screws 30, 35 and the sidewalls 27 and 28 of through apertures 25 and 26 occurs for each set at a single point to facilitate shifting clamping band 20 between the clamped and relaxed conditions. Also, mounting screws 30, 35 are configured relative to the thickness of the enlarged ends 23, 24 of clamping band 20, such that the lowermost portions of the tapered heads 32, 37 abut or bottom out against the adjacent mounting face 16 of the associated die member 15, as shown in FIGS. 5-8, whereby the constricting clamping forces applied by clamping band 20 to the gas spring body 7 are positively limited to the predetermined designed amount necessary to securely retain the associated gas spring body 7 therein, without damaging the gas spring 6 or the clamping band 20.

With reference to FIGS. 14-17, the illustrated clamping band 20 preferably has a resilient and elastically deformable construction, whereby in the clamped condition shown in FIG. 17, the medial portion 22 of clamping band 20 assumes a slightly non-circular or generally obround plan shape that is defined by a plurality of circumferentially spaced apart contact portions 72 associated with contact pads 70 whose contact surfaces 71 abut the outside surface of the gas spring body 7, as well as a plurality of non-contact portions 73 disposed circumferentially in between the contact portions 72. When both mounting screws 30 and 35 are tightened to the clamped condition shown in FIG. 17, the non-contact portions 73 of clamping band 20 resiliently tense in a generally longitudinal or lengthwise direction and draw the contact surfaces 71 on contact pads 70 abuttingly against the gas spring body 7 to securely, yet releasably retain the gas spring body 7 in the clamping band 20. More specifically, the longitudinal tensing of the non-contact portions 73 of clamping band 20, which are spaced apart circumferentially about the gas spring body 7 in the manner shown in FIGS. 14-17, stretch the same slightly, thereby generating constant clamping forces, as illustrated by the arrows in FIG. 17, that are constrictingly applied to the gas spring body 7 at the contact surfaces 71 of contact pad 70. In the example illustrated in FIGS. 14-17, the clamping band 20 has three contact portions 72 separated by two non-contact portions 73.

With reference to FIGS. 10-13, the gas spring retainer assembly 1 is used to mount a gas spring 6 in an associated die member 15 in the following manner. Initially, as will be readily appreciated by those skilled in the art, gas spring retainer assembly 1 can be used to mount a wide variety of differently sized and shaped gas springs in numerous locations and orientations in any given metal forming die. Hence, the term "die member" as used herein, refers to any portion of the metal forming die or die set 9, including, but not limited to, upper die shoe 2, lower die shoe 3, and all die components 4. As shown in FIGS. 10 and 10A, a blind hole pocket 80 is formed in the associated die member 15 with a cylindrically shaped sidewall 81 shaped for close reception of the body portion 7 of an associated gas spring 6 therein, and a bottom wall 82 on which the end portion 11 of the gas spring body 7 is abuttingly supported. The two threaded retainer apertures 42 and 43 are formed in the outer surface 16 of die member 15, wherein both are spaced laterally apart a predetermined distance from the blind hole pocket 70, and oriented generally parallel therewith, as shown in FIG. 10A. Threaded retainer apertures 42 and 43 are also spaced laterally apart from one another by a predetermined distance that is selected in accordance with the lateral distance between the through apertures 25 and 26 in the enlarged ends 23 and 24 of clamping band 20. The blind hole pocket 80 and both threaded retainer apertures 42 and 43 can be formed using simple, conventional machine techniques. With reference to FIG. 11, the clamping band 20 is then placed abuttingly on top of the outer surface 16 of the die member 15, with the medial portion 22 positioned generally over the blind hole pocket 70, and the first through aperture 25 in the first enlarged end 23 of clamping band 20 positioned generally over the first threaded retainer aperture 42. The first mounting screw 30 is then inserted through the through hole 25 in the first enlarged end 23 of clamping band 20 and engaged into the first threaded retainer aperture 42 in either a fully tightened or slightly tightened condition, so that the clamping band 20, which is in the relaxed condition, remains in place on the outer surface 16 of die member 15 with the medial portion 22 disposed over blind hole pocket 80. The tightening of the first mounting screw 30 automatically and accurately centers the first through aperture 25 in clamping band 20 over the first threaded retainer aperture 42 in die member 15, as shown in FIGS. 12 and 16, and holds clamping band 20 in place on the outer surface 16 of die member 15. With reference to FIG. 12, the body portion 7 of gas spring 6 is then inserted through the medial portion 22 of clamping band 20 and into the blind hole pocket 80 in die member 15, until the end 11 of the gas spring body 7 abuts the bottom 82 of blind hole pocket 80. Next, the second mounting screw 35 is inserted through the second through aperture 26 in the second enlarged end 24 of clamping band 20 and loosely engaged in the second retainer aperture 43 in die member 15. It is noteworthy that in the unclamped condition, such as illustrated in FIGS. 12 and 16, the second threaded retainer aperture 43 in the die member 15 will be disposed in a generally eccentric or laterally offset relationship relative to the second through aperture 26 in the second enlarged end 24 of clamping band 20, but only by an amount that permits insertion of the shank end 36 of the second mounting screw 32 into the second threaded retainer aperture 43. Next, the second mounting screw 35 is tightened into the second retainer aperture 43 in die member 15, such that the tapered head portion 37 of the second mounting screw 35 engages the sidewall 28 of the second through aperture 26 and shifts the second enlarged end portion 23 of the clamping band 20 laterally toward the first enlarged end portion 23 of clamping band 20, thereby pulling the medial portion 22 of the clamping band 20 constrictingly against the gas spring body 27 to securely, yet detachably retain the gas spring 6 on the die member 15 in the clamped condition. The gas spring 6 is not only securely, yet detachably, clamped in the gas spring retainer assembly 1, it is also simultaneously accurately centered within the blind hole pocket 80 of die member 15. The gas spring 6 can be easily removed from the gas spring retainer assembly 1 and detached from the die member 15 by simply untightening one of the two mounting screws 30, 35, such that clamping band 20 automatically shifts back to the unclamped or relaxed condition due to the resilient nature of the clamping band 20.

As will be appreciated by those having skill in the art, gas spring retainer assembly 1 can also be used to mount gas spring 6 to an associated die member 15 by inserting both mounting screws 30, 35 loosely into their associated threaded retainer apertures 42, 43 in die member 15, and then inserting the gas spring body 7 through the medial portion 22 of clamping band 20 and into the blind hole pocket 80 in die member 15. Both mounting screws 30, 35 can then be either simultaneously or sequentially tightened, so as to pull the medial portion 22 of the clamping band 20 constrictingly against the gas spring body 70, so as to securely, yet detachably retain the gas spring on the die member 15 in the clamped condition. The lateral spacing of the through apertures 25, 26 in clamping band 20 can be varied relative to the lateral spacing of the associated threaded retainer apertures 42, 43 in the die member 15 to adjust the amount of convergence and divergence between contact pads 70 and the enlarged end portions 23, 24 of the clamping band 20 and/or the amount of clamping force applied by clamping band 20 to the associated gas spring body 7, and thereby accommodate a wide variety of different applications.

Figure 18:
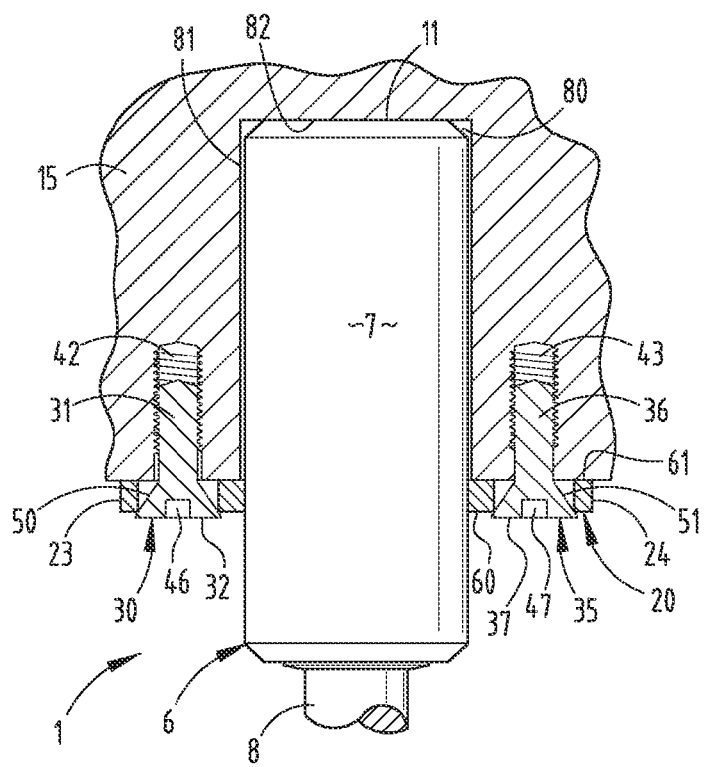
FIG. 18 is a cross-sectional view of the gas spring retainer assembly of FIGS. 1-17, shown retaining an associated gas spring in an alternative orientation in an associated die member.
Figure 19:
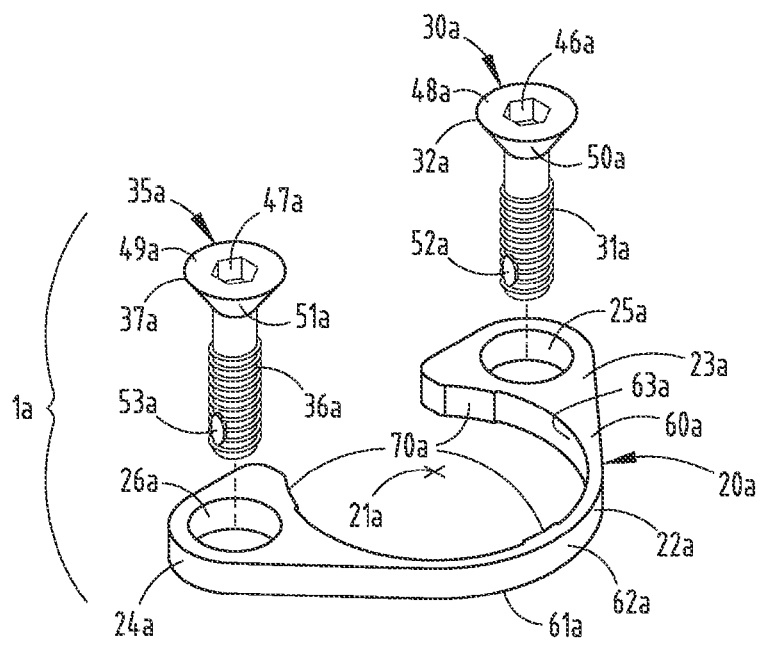
FIG. 19 is an exploded perspective view of an alternate gas spring retainer assembly embodying the present invention.

As is apparent to those having skill in the art, gas spring retainer assembly 1 can be used to mount differently shaped and sized gas springs in upper die shoes, lower die shoes, and other die components in a wide variety of different positions and orientations, including the example illustrated in FIG. 1, wherein gas spring retainer assembly 1 is shown attached to a lower die shoe, or a forming pad, as well as the orientation illustrated in FIG. 18, wherein the gas spring retainer assembly 1 is shown attached to an upper die shoe or to a stripper plate. The clamping forces generated by gas spring retainer assembly 1 are sufficient to securely retain an associated gas spring 6 in place anywhere along the length of the gas spring body, without the need for mounting grooves, ribs or other special retainer features or profiles in the outside surface of the gas spring body 7, as is required by many current gas spring retainer systems.

Clamping band 20 is preferably provided in a wide variety of different sizes or diameters to accommodate mounting differently sized gas springs. While the diameter of the interior side wall 63 of the medial portion 22 of clamping band 20 varies in accordance with the outside diameter of the associated gas spring 6, the overall configuration, design and function of the gas spring retainer assembly 1 is the same for all such sizes. More specifically, in the embodiment illustrated in FIGS. 1-17, the diameter of the interior contact surfaces 71 on the medial portion 22 of clamping band 20 is purposely formed slightly larger than the outside diameter of the associated gas spring body 7. For example, in one working embodiment of the present invention, the diameter of the contact surfaces 71 on the medial portion 22 of clamping band 20 is in the range of 2.000 to 2.020 inches, with an associated radial wall thickness in the range of 0.180 to 0.220 inches, and lateral thickness of 0.230 to 0.270 inches, which is designed to receive therein a gas spring body 7 having an outside diameter of 1.968 inches or 50.0 mm. As will be appreciated by those skilled in the art, the difference between the diameters of the contact surfaces 71 on clamp band 20 and the associated gas spring body 7 can be adjusted, along with the radial wall thickness of medial portion 23, the material being used, and other similar factors to obtain the desired clamping force for any given application.

A plurality of clamping bands 20 are preferably cut from a solid flat plate of material that is generally rigid, although is capable of elastic deformation, such as various metals, including steel and the like. Preferably, differently sized clamping bands 20 are cut from a single plate 80 of 1018 carbon steel stock material, using a nested pattern, so as to improve economy of manufacture and reduce waste. The various clamping bands 20 are preferably cut from the plate using either a laser cutting process, an abrasive water jet process, or other similar techniques. Since the opposite faces 60 and 61 of the clamping band 20 and related marginal surfaces 62, 63, etc. are disposed in a mutually perpendicular relationship, no additional machining or processing is required after cutting. The plate-cut clamping bands 20 can simply be deburred and surface treated if necessary, thereby minimizing manufacturing costs. Such cutting techniques provide very accurate and consistent size and shape tolerances, and permit marking all of the clamping bands 20 with identification indicia prior to the final cutting in a single set up in the cutting machine, thereby improving accuracy and efficiency.

Figure 20:
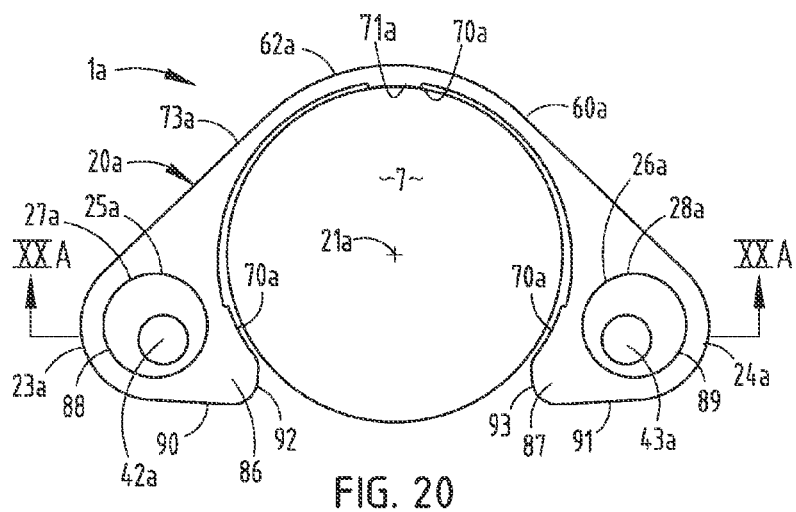
FIG. 20 is a plan view of the gas spring retainer assembly of FIG. 19, shown in the relaxed condition about an associated gas spring body which is illustrated schematically.
Figure 20A:
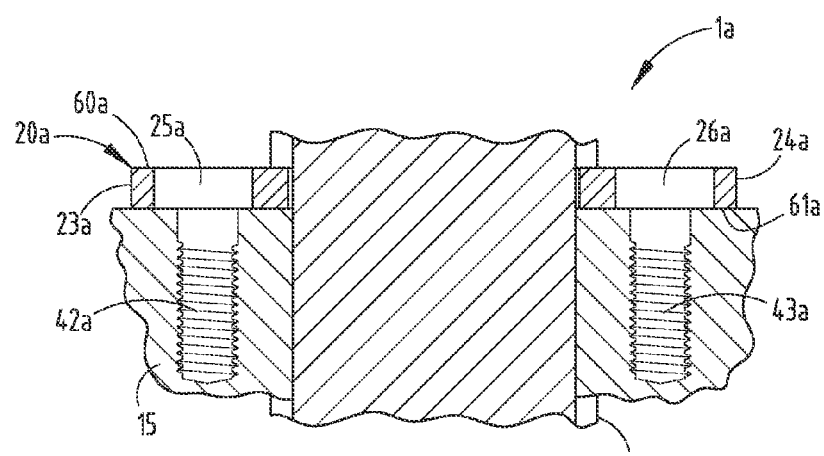
FIG. 20A is a cross-sectional view of a clamping band portion of the gas spring retainer assembly of FIGS. 19-20, shown in the relaxed condition, along with an associated gas spring and die member.
Figure 21:
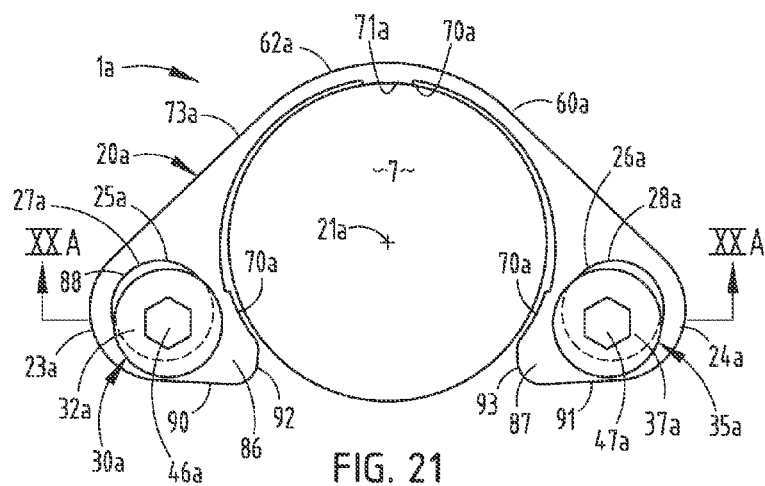
FIG. 21 is a plan view of the gas spring retainer assembly of FIGS. 19-20a, shown with two mounting screws installed in a loose condition about a gas spring body that is illustrated schematically.
Figure 21A:
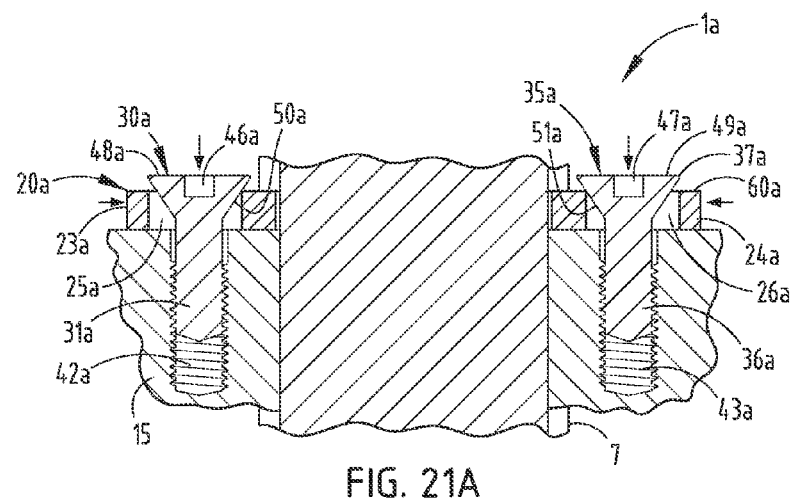
FIG. 21A is a cross-sectional view of the gas spring retainer assembly and associated gas spring and die member in the relaxed, partially assembled condition shown in FIG. 21.
Figure 22:
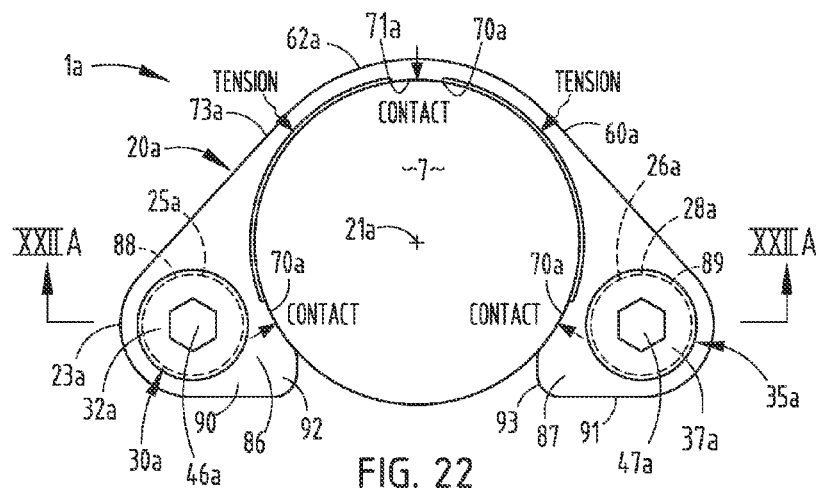
FIG. 22 is a plan view of the gas spring retainer assembly of FIGS. 19-21A, shown in the fully clamped condition.
Figure 22A:
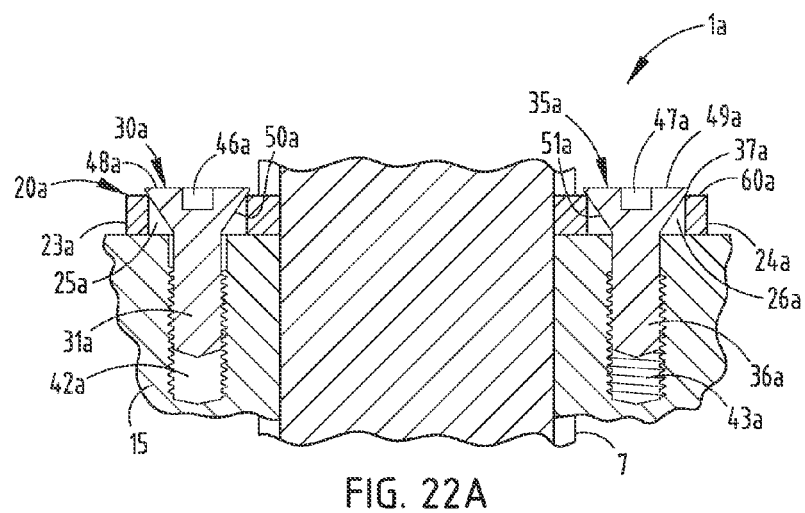
FIG. 22A is a cross-sectional view of the gas spring retainer assembly of FIGS. 19-22, shown in the fully clamped condition, along with an associated gas spring and die member.
Figure 23:
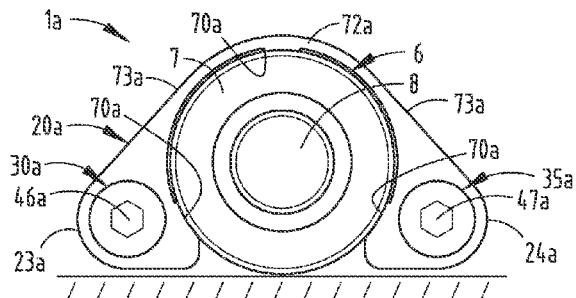
FIG. 23 is a plan view of the gas spring retainer assembly of FIGS. 19-22, shown installed adjacent a wall portion of an associated die member.
Figure 24:
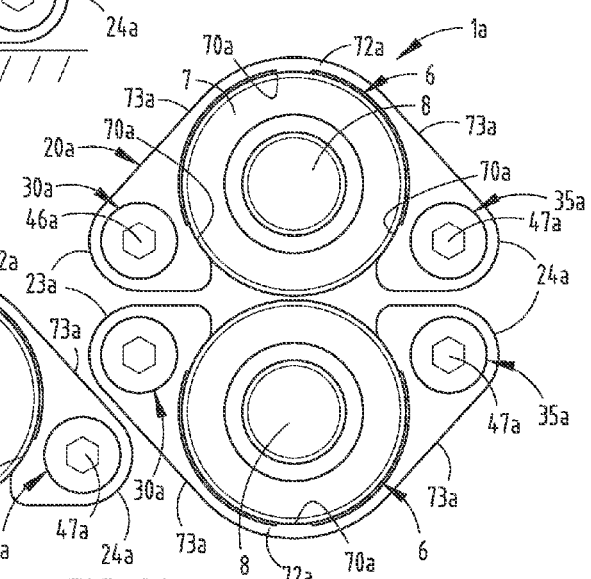
FIG. 24 is a plan view of a plurality of gas spring retainer assemblies of FIGS. 19-23, shown mounted in a nested relationship on an associated die member.

The reference numeral 1a (FIGS. 19-24) generally designates another embodiment of the present invention. Since gas spring retainer assembly 1a is similar to the previously described gas spring retainer assembly 1, similar parts appearing in FIGS. 1-8 and 19-24, respectively, are represented by the same, corresponding reference numerals, except for the suffix "a" in the numerals of the latter. In the gas spring retainer assembly 1a, the plan shape of clamping band 20a is somewhat different from the plan shape of the clamping band 20 associated with gas spring retainer assembly 1, although the two gas spring retention assemblies 1 and 1a are functionally quite similar. More specifically, the clamping band 20a associated with gas spring retainer assembly 1a has a generally U-shaped plan configuration which is much more open or wide than that of clamping band 20. The enlarged ends 23a and 24a of clamping band 20 include squared off end portions 86 and 87 that extend inwardly from circular portions 88 and 89 in which through apertures 25a and 26a are disposed. As best illustrated in FIGS. 20-22, the enlarged end portions 23a and 24a of clamping band 20a include flat terminal edges 90 and 91 with curved nose portions 92 and 93 that blend back toward the inner sidewall 63a of the medial portion 22a, where the two outer contact pads 70a and related contact surfaces 71a are disposed. With this arrangement, the outside surface of the gas spring body 7 protrudes only slightly beyond the flat end edges 90 and 91 of enlarged end portions 23a and 24a, which permits gas springs 6 to be positioned more closely together and/or against die walls within any given die member 15, as best shown in FIGS. 23-24. As shown in FIGS. 20-22a, functionally, clamping band 20a operates somewhat similar to clamping band 20, except in the example illustrated in FIGS. 19-24, clamping band 20a is configured such that the through apertures 25a, 26a, in the enlarged end portions 23a, 24a of clamping band 20a are both disposed in an eccentric, laterally off set relationship relative to the associated threaded retainer apertures 42a, 43a in die member 15, as best shown in FIGS. 20 and 20A. The lateral spacing of the through apertures 25a, 26a in clamping band 20a can be varied relative to the lateral spacing of the associated threaded retainer apertures 42a, 43a in the die member 15 to adjust the amount of convergence and divergence between contact pads 70 and the enlarged end portions 23a, 24a of the clamping band 20a and/or the amount of clamping force applied by clamping band 20a to the associated gas spring body 7, and thereby accommodate a wide variety of different applications. In the illustrated example, when clamping band 20a in the unclamped condition, the central axes of threaded retainer apertures 42a, 43a are eccentric or laterally off set relative to the central axes of the through apertures 25a, 26a in clamping band 20a both radially inwardly toward axis 21a and outwardly toward terminal edges 90, 91 in the manner illustrated in FIGS. 20 and 21. As best shown in FIGS. 21 and 21A, the mounting screws 30a, 35a are inserted through the two through apertures 25a, 26a in clamping band 20a and engaged loosely in the threaded retainer apertures 42a, 43a in die member 15, such that clamping band assumes the unclamped condition, and the gas spring body 7 can be easily inserted through the medial portion 22a of clamping band 20a. With the gas spring body 7 positioned in the medial portion 22a of clamping band 20a, the two mounting screws 30, 35 are tightened, which pulls the two enlarged ends 23a, 24a of clamping band 20a toward one another, such that the three contact surfaces 71a on contact pads 70a abut constrictingly against the gas spring body 7 to securely, yet detachably retain the gas spring 6 on the associated die member 15 in the clamped condition, and center the same within an associated blind hole pocket 80.

Figure 25:
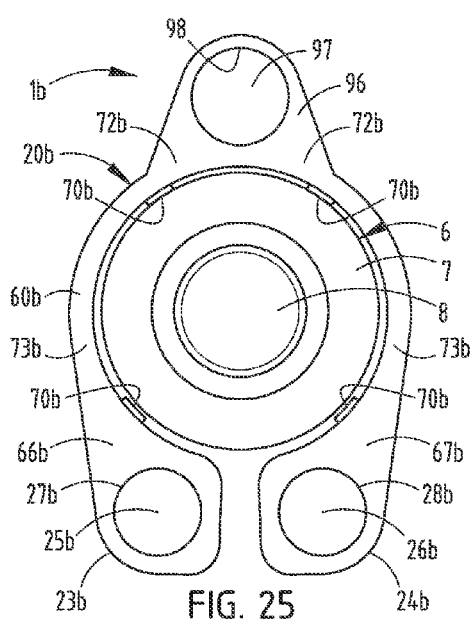
FIG. 25 is a plan view of yet another gas spring retainer assembly embodying the present invention, shown in an unclamped condition.
Figure 26:
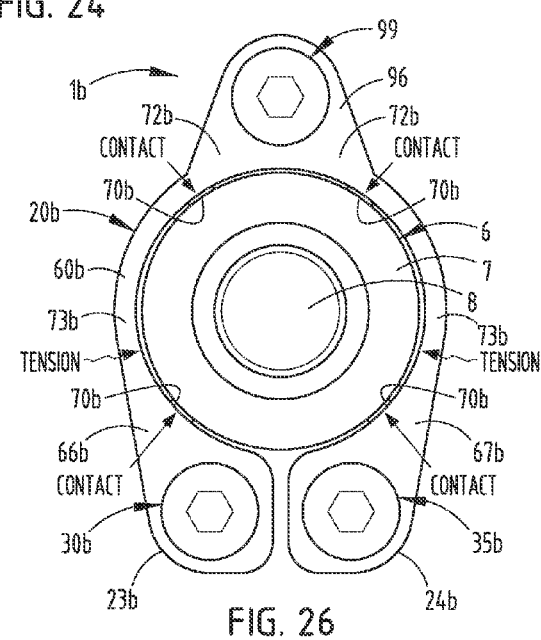
FIG. 26 is a plan view of the gas spring retainer assembly of FIG. 25, shown in a fully clamped condition.
Figure 27:
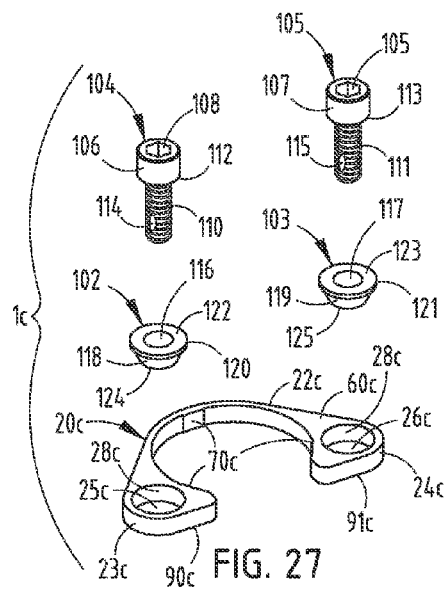
FIG. 27 is an exploded perspective view of another alternate gas spring retainer assembly embodying the present invention.
Figure 28:
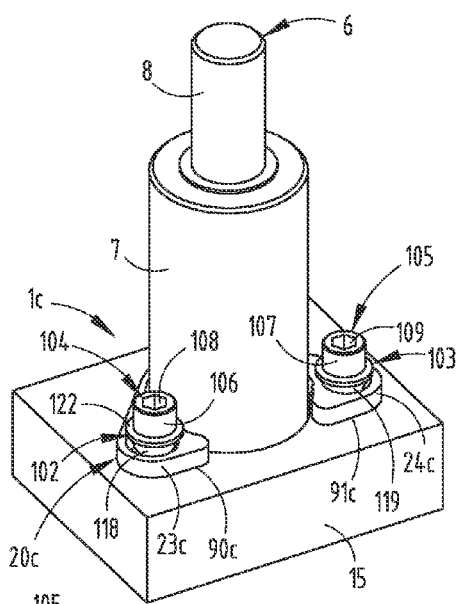
FIG. 28 is a perspective view of the gas spring retainer assembly of FIG. 27, shown in a partially installed, unclamped condition in an associated die member, along with a gas spring positioned therein.
Figure 29:
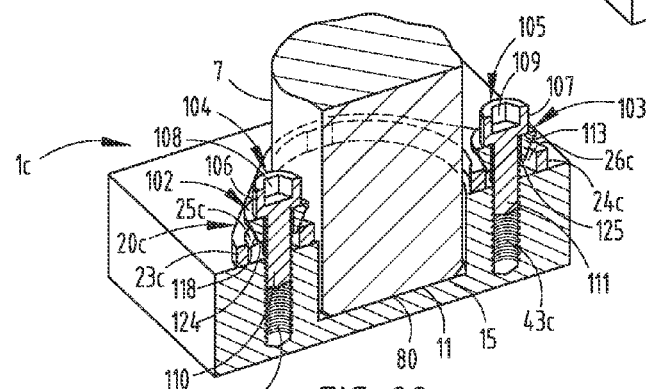
FIG. 29 is a perspective cross-sectional view of the gas spring retainer assembly of FIGS. 27-28, shown in the partially installed condition of FIG. 28, along with a portion of a gas spring positioned therein.

The reference numeral 1b (FIGS. 25 and 26) generally designates yet another embodiment of the present invention. Since gas spring retainer assembly 1b is similar to the previously described gas spring retainer assembly 1, similar parts appearing in FIGS. 1-8 and 25-26, respectively, represented by the same, corresponding reference numerals, except for the suffix "b" in the numerals of the latter. The clamping band 20b associated with gas spring retainer assembly 1b is generally similar to the clamping band 20 associated with the previously described gas spring retainer assembly 1, except that the medial portion 22b of clamping band 20b includes an outwardly protruding mounting flange 96 that includes a third through aperture 97 defined by a sidewall 98 into which a third mounting screw 99 is received. The third mounting screw 99 is preferably identical in size and construction to the other two mounting screws 30b and 35b, and includes a threaded shank and a tapered head. In operation, the shank portion of the third mounting screw 99 is inserted through the third through aperture 97 in the mounting flange 96 and is anchored in a third threaded retainer aperture (not shown) that is disposed generally opposite the first and second threaded retainer apertures. The tightening of the third mounting screw 99 retains the clamping band 20b in place on the mounting surface of the die member. The first and second mounting screws 30b and 35b are then inserted through the through apertures 25b and 26b in the enlarged ends 23b and 24b of clamping band 20b, and are tightened, so as to pull the medial portion 22b of the clamping band 20b constrictingly against the gas spring body 7 to securely, yet detachably retain the gas spring 6 in the die member 15 in the clamped condition, and center the same in an associated blind hole pocket.

The reference numeral 1c (FIGS. 27-33) generally designates yet another embodiment of the present invention. Since gas spring retainer assembly 1c is similar to the previously described gas spring retainer assembly 1 and 1a, similar parts appearing in FIGS. 1-18; 19-24 and 27-33, respectively, are represented by the same, corresponding reference numerals, except for the suffix "c" in the numerals of the latter. The clamping band 20c associated with gas spring retainer assembly 1c is generally similar to the clamping band 20a associated with the previously described gas spring retainer assembly 1a. However, gas spring retainer assembly 1c includes two tapered plugs 102, 103 and two socket head cap screw type of mounting screws 104, 105, instead of the tapered flat head screws 30a, 35a used with gas spring retainer retention assembly 1a. More specifically, as best shown in FIGS. 27-30, the socket head cap screws 104,105 associated with gas spring retainer retention assembly 1c have a conventional or standard shape, comprising cylindrical head portions 106, 107 with tool sockets 108, 109 in the outer end or face thereof, and threaded shank portions 110, 111. The head portions 106, 107 of socket head cap screws 104, 105 have flat, inner abutment surfaces 112, 113 oriented generally perpendicular to the central axes of the shank portions 110, 111. The threaded shanks 110, 111 of the illustrated cap screws 104, 105 have self-locking nylon patches 114, 115 which serve to retain the mounting screws 104, 105 tight in the associated die member 15, at least when clamping band 20c is in the clamped condition.

Figure 30:
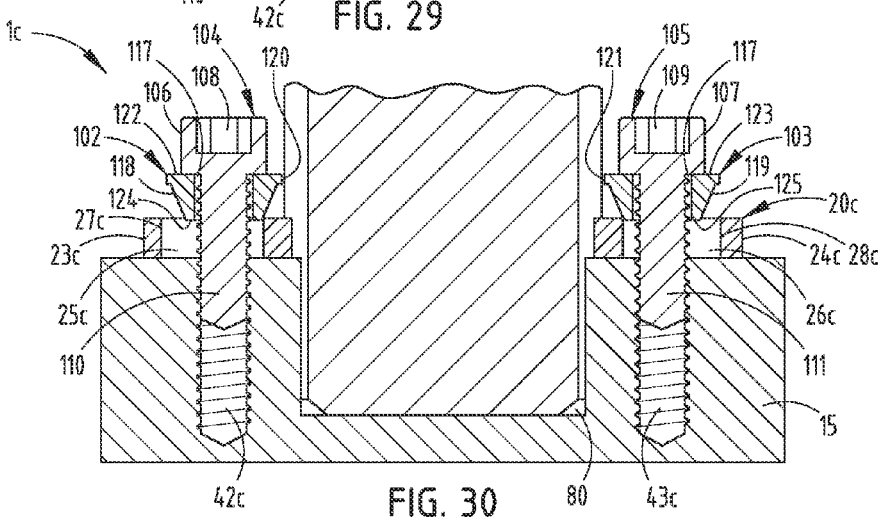
FIG. 30 is a cross-sectional view of the gas spring retainer assembly of FIGS. 27-29, shown in the partially installed condition of FIGS. 28 and 29, along with a portion of a gas spring positioned therein.

The tapered plugs 102, 103 associated with gas spring retainer retention assembly 1c have central apertures 116, 117 in which the shank portions 110, 111 of cap screws 104, 105 are received, and tapered exterior walls 118, 119, each with an outside diameter that is at least equal to, or greater than, the diameter of the first and second through apertures 25c, 26c in the enlarged end portions 23c, 24c of clamping band 20c. In the illustrated example, tapered plugs 102, 103 have generally cylindrically shaped outer collar portions 120, 121 that meet the tapered exterior walls 118, 119 adjacent the outer portions of tapered plugs 102, 103. Tapered plugs 102, 103 have generally flat outer faces 122, 123, which are oriented generally perpendicular to the central axes of tapered plugs 102, 103, and wedge shaped inner ends 124, 125. As best illustrated in FIGS. 20-23, the outer faces 122, 123 of tapered plugs 102, 103 are configured to abut the inner or abutment surfaces 112, 113 of cap screws 104, 105, and the lower edges of the collar portions 120, 121 of tapered plugs 102, 103 are configured to abut the outer surface 60c of clamping band 20c when clamping band 20b is in the clamped condition, as shown in FIGS. 31-33. The abutment between the lower edges of tapered plug collars 120, 121 and the outer surface 66c of clamping band 20c serves to positively limit the constriction of the medial portion 22c of clamping band 20c about the gas spring retainer body 7. With reference to FIGS. 30 and 33, the diameter of the largest portions of the tapered walls 118, 119 on the illustrated tapered plugs 102, 103, which are oriented outwardly away from the associated clamping band 20c near collars 120, 121, is substantially equal to the diameters of the through apertures 25c, 26c in clamping band 20c.

In the example shown in FIGS. 27-33, when clamping ring 20c is in the unclamped condition, both the first and second threaded retainer apertures 42c, 43c in the die member 15 are disposed in an eccentric, laterally offset relationship with the first and second through apertures 25c, 26c in said clamping band 20c. Like the previously described clamping ring 20a, the lateral spacing of the through apertures 25c, 26c in clamping band 20c can be varied relative to the lateral spacing of the associated threaded retainer apertures 42c, 42c in the die member 15 to adjust the amount of convergence and divergence between contact pads 70c in the enlarged end portions 23c, 24c of clamping band 20c and/or the amount of clamping force applied by clamping band 20c to the associated gas spring body 7, and thereby accommodate a wide variety of different applications. In the illustrated example, when clamping band 20c in the unclamped condition (FIGS. 27-30), the central axes of threaded retainer apertures 42c, 43c are eccentric or laterally off set relative to the central axes of the through apertures 25c, 26c in clamping band 20c both radially inwardly toward axis 21c and outwardly toward terminal edges 90c, 91c in the position illustrated in FIGS. 28-30. The shank portions 110, 111 of the mounting screws 104, 105 are threadedly engaged in the threaded retainer apertures 42c, 43c in the die member 15. The tightening of the first and second mounting screws 104, 105 engages the abutment surfaces 112, 113 on the enlarged head portions 106, 107 of the first and second mounting screws 104, 105 against said first and second tapered plugs 102, 103 and draws the tapered plugs 102, 103 toward the die member 15, which in turn engages the tapered exterior walls 118, 119 of the tapered plugs 102, 103 against the first and second sidewalls 27c, 28c of the first and second through apertures 25c, 26c in the clamping band 20c, and shifts the first and second enlarged end portions 23c, 24c of the clamping band 20c laterally toward one another, thereby pulling the medial portion 22c of the clamping band 20c constrictingly against the gas spring body 7 to securely, yet detachably retain the gas spring 6 on the die member 15.

As will be appreciated by those skilled in the art, clamping rings 20, 20a, 20b and 20c can be used with different types of mounting screw mechanisms. For example, the tapered plug 102, 103 and cap head screw 104, 105 shown in FIGS. 27-33 could be used with the clamping ring 20 shown in FIGS. 1-18, although the same might not be advantageous for all applications.

Each of the gas spring retention assemblies 1-1c provides a less expensive, more economical mechanism for retaining gas springs and similar reaction devices in an associated metal forming die or die component. The gas spring retention assemblies 1-1c have a solid metal construction that is very durable, and is compatible with a wide variety of different sizes and configurations of gas springs, and also permits quick and easy assembly. Gas spring retention assemblies 1-1c greatly reduce the amount of machining associated with the mounting of gas springs, and provide very secure circumferential clamping on the cylindrical body to secure and center the same without damaging the gas spring or the clamping ring. The clamping bands 20-20c can be economically manufactured from a solid, flat plate of metal or the like and formed in a nested configuration to reduce material cost and waste. Conventional flat head cap screws can be used to mount the clamping bands, so as to reduce cost and tool room inventory.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. In a metal forming die of the type having at least one gas spring mounted between first and second reciprocating die members, the improvement of a gas spring retainer assembly, comprising:
   a one-piece, clamping band having a generally U-shaped plan configuration with a central axis of symmetry, and defined by:
      a generally arcuate medial portion disposed generally about said central axis of symmetry, shaped to receive a body portion of said gas spring therein, and configured for resilient shifting between clamped and unclamped conditions;
      first and second enlarged end portions, having associated first and second through apertures oriented generally parallel with said central axis of symmetry and defined by first and second sidewalls shaped to receive associated fasteners therein for attaching said clamping band to said first die member;
   a first mounting screw having a threaded shank portion extending through said first through aperture in said clamping band and anchored in said first die member, and an enlarged head portion engaging said first enlarged end portion of said clamping band in said clamped condition;
   a second mounting screw having a threaded shank portion extending through said second through aperture in said clamping band and anchored in said first die member, and a tapered head portion with at least a portion thereof having an outside diameter that is greater than said second through aperture in said clamping band;
   a first threaded retainer aperture in said first die member disposed concentric with said first through aperture in said clamping band and anchoring said shank portion of said first mounting screw therein, whereby tightening of said first mounting screw securely mounts said first enlarged end portion of said clamping band on said first die member; and
   a second threaded retainer aperture in said first die member disposed in said unclamped condition laterally offset from said second through aperture in said clamping band and anchoring said shank portion of said second mounting screw therein, whereby tightening of said second mounting screw engages said tapered head portion of said second mounting screw against said sidewall of said second through aperture and shifts said second enlarged end portion of said clamping band laterally toward said first enlarged end portion of said clamping band, thereby pulling said medial portion of said clamping band constrictingly against said gas spring body to securely, yet detachably retain said gas spring on said first die member in said clamped condition.

2. A metal forming die as set forth in claim 1, wherein:
   said tapered head portion of said second mounting screw is configured such that when said second mounting screw is loosely retained in said first die member, said clamping band assumes said unclamped condition in which said gas spring body can be freely inserted into and removed from said medial portion of said clamping band, and when said second mounting screw is tightly anchored in said first die member, said clamping band assumes said clamped condition in which said gas spring body is securely retained in said medial portion of said clamping band.

3. A metal forming die as set forth in claim 2, wherein:
   said enlarged head portion of said first mounting screw is tapered and automatically centers said first through aperture in said clamping band over said first threaded retainer aperture in said first die member when said first mounting screw is tightened.

4. A metal forming die as set forth in claim 3, wherein:
   said first and second mounting screws have a substantially identical size and configuration.

5. A metal forming die as set forth in claim 4, wherein:
   said medial portion of said clamping band includes an inner marginal sidewall surface having a generally circular plan shape in said unclamped condition configured to closely receive said gas spring body therein, whereby when said second mounting screw is tightened to said clamped condition, said inner marginal sidewall of said medial portion abuttingly clamps constricting about at least portions of the circumference of said gas spring body to both center and securely, yet releasably, retain the same therein.

6. A metal forming die as set forth in claim 5, wherein:
   said medial portion of said clamping band has a resilient and elastically deformable construction, whereby in said clamped condition, said inner marginal sidewall of said clamping band assumes a non-circular plan shape defined by a plurality of circumferentially spaced apart contact surfaces abutting said gas spring body, and a plurality of non-contact surfaces disposed circumferentially in between said contact surfaces, whereby when said second mounting screw is tightened to said clamped condition, those portions of said clamping band associated with said non-contact surfaces resiliently tense longitudinally and draw said contact surfaces abuttingly against said gas spring body to resiliently and constrictingly clamp the same at said contact surfaces, thereby securely, yet releasably, retaining said gas spring body in said clamping band.

7. A metal forming die as set forth in claim 6, wherein:
said medial portion of said clamping band includes a plurality of contact pads protruding radially inwardly from said inner marginal sidewall, and are spaced apart circumferentially to define said contact surfaces.

8. A metal forming die as set forth in claim 7, including:
a blind hole pocket disposed in a first face of said first die member and having a cylindrically shaped sidewall closely receiving said gas spring body therein and a bottom abuttingly supporting an end portion of said gas spring thereon.

9. A metal forming die as set forth in claim 8, wherein:
said clamping band is positioned abuttingly on top of said first face of said first die member at a location wherein said medial portion thereof is generally overlying said blind hole pocket to minimize machining of said first die member.

10. A metal forming die as set forth in claim 9, wherein:
said second through aperture in said clamping band is configured such that in said clamped condition, said tapered head portion of said second mounting screw abuts said first face of said first die member, and thereby positively limits the constriction of said medial portion of said clamping band about said gas spring body.

11. A metal forming die as set forth in claim 10, wherein:
said clamping band is configured such that contact between said tapered head portion of said second mounting screw and said second enlarged end portion of said clamping band occurs at a single point to facilitate shifting said clamping band to said clamped condition.

12. A metal forming die as set forth in claim 11, wherein:
said clamping band has generally flat, mutually parallel and oppositely disposed first and second faces; and
said inner marginal sidewall surface of said medial portion is oriented generally perpendicular to said first and second faces.

13. A metal forming die as set forth in claim 12, wherein:
said clamping band is cut from a flat plate of metal.

14. A retainer assembly for mounting gas springs in metal forming dies, comprising:
 a one-piece, clamping band having a generally U-shaped plan configuration with a central axis of symmetry, and defined by:
  a generally arcuate medial portion disposed generally about said central axis of symmetry, shaped to receive a body portion of said gas spring therein, and configured for resilient shifting between clamped and unclamped conditions;
  first and second enlarged end portions, having associated first and second through apertures oriented generally parallel with said central axis of symmetry and defined by first and second sidewalls shaped to receive associated fasteners therein for attaching said clamping band to the first die member;
 a first mounting screw having a threaded shank portion extending through said first through aperture in said clamping band and anchored in the first die member, and an enlarged end portion engaging said first enlarged portion of said clamping band in said clamped condition;
 a second mounting screw having a threaded shank portion extending through said second through aperture in said clamping band and anchored in the first die member, and a tapered head portion with at least a portion thereof having an outside diameter that is greater than said second through aperture in said clamping band; and wherein
 said first through aperture in said clamping band is configured to be disposed in a concentric relationship with a first threaded retainer aperture in the first die member in which said shank portion of said first mounting screw is anchored, whereby tightening of said first mounting screw securely mounts said first enlarged end portion of said clamping band on the first die member; and
 said second through aperture in said clamping band is configured when in said unclamped condition to be disposed in a laterally offset relationship with a second threaded retainer aperture in the first die member in which said shank portion of said second mounting screw is anchored, whereby tightening of said second mounting screw engages said tapered head portion of said second mounting screw against said sidewall of said second through aperture and shifts said second enlarged end portion of said clamping band, laterally toward said first enlarged end portion of said clamping band thereby pulling said medial portion of said clamping band constrictingly against the gas spring body to securely, yet detachably retain the gas spring on the first die member in said clamped condition.

15. A retainer assembly as set forth in claim 14, wherein:
said tapered head portion of said second mounting screw is configured such that when said second mounting screw is loosely retained in the first die member, said clamping band assumes said unclamped condition in which the gas spring body can be freely inserted into and removed from said medial portion of said clamping band, and when said second mounting screw is tightly anchored in the first die member, said clamping band assumes said clamped condition in which the gas spring body is securely retained in said medial portion of said clamping band.

16. A retainer assembly as set forth in claim 15, wherein:
said enlarged head portion of said first mounting screw is tapered and automatically centers said first through aperture in said clamping band over the first threaded retainer aperture in the first die member when said first mounting screw is tightened.

17. A retainer assembly as set forth in claim 16, wherein:
said first and second mounting screws have a substantially identical size and configuration.

18. A retainer assembly as set forth in claim 17, wherein:
said medial portion of said clamping band includes an inner marginal sidewall surface having a generally circular plan shape in said unclamped condition configured to closely receive said gas spring body therein, whereby when said second mounting screw is tightened to said clamped condition, said inner marginal sidewall of said medial portion abuttingly clamps constricting about at least portions of the circumference of said gas spring body to both center and securely, yet releasably, retain the same therein.

19. A retainer assembly as set forth in claim 18, wherein:
said medial portion of said clamping band has a resilient and elastically deformable construction, whereby in said clamped condition, said inner marginal sidewall of said clamping band assumes a non-circular plan shape defined by a plurality of circumferentially spaced apart contact surfaces abutting said gas spring body, and a plurality of non-contact surfaces disposed circumferentially in between said contact surfaces, whereby when said second mounting screw is tightened to said clamped condition, those portions of said clamping band associated with said non-contact surfaces resiliently tense longitudinally and draw said contact surfaces abuttingly against said gas spring body to resiliently and constrictingly clamp the same at said contact surfaces, thereby securely, yet releasably, retaining said gas spring body in said clamping band.

20. A metal forming die as set forth in claim 19, wherein:
said medial portion of said clamping band includes a plurality of contact pads protruding radially inwardly from said inner marginal sidewall, and are spaced apart circumferentially to define said contact surfaces.

21. A retainer assembly as set forth in claim 20, wherein:
said clamping band is configured to be positioned abuttingly on top of a first face of the first die member at a location generally overlying a blind hole pocket therein to minimize machining of the first die member.

22. A retainer as set forth in claim 21, wherein:
said second through aperture in said clamping band is configured such that in said clamped condition, said tapered head portion of said second mounting screw abuts the first face of the first die member, and thereby positively limits the constriction of said medial portion of said clamping band about the gas spring body.

23. A retainer assembly as set forth in claim 22, wherein:
said clamping band is configured such that contact between said tapered head portion of said second mounting screw and said second enlarged end portion of said clamping band occurs at a single point to facilitate shifting said clamping band to said clamped condition.

24. A retainer assembly as set forth in claim 23, wherein:
said clamping band has generally flat, mutually parallel and oppositely disposed first and second faces; and
said inner marginal sidewall surface of said medial portion is oriented generally perpendicular to said first and second faces.

25. A retainer assembly as set forth in claim 24, wherein:
said clamping band is cut from a flat plate of metal.

26. In a method for making a metal forming die of the type having at least one gas spring mounted between first and second reciprocating die members, the improvement comprising:
forming a blind hole pocket in the first die member with a sidewall shaped for close reception of the body portion of the gas spring therein, and a bottom on which an end portion of the gas spring is abuttingly supported;
forming a one-piece, clamping band having a generally U-shaped plan configuration with a central axis of symmetry, with a generally arcuate medial portion disposed generally about the central axis of symmetry, shaped to receive a body portion of said gas spring therein, and configured for resilient shifting between clamped and unclamped conditions, and first and second enlarged end portions, having associated first and second through apertures oriented generally parallel with the central axis of symmetry and defined by a sidewall shaped to receive a fastener therein for attaching the clamping band to the first die member;
providing a first mounting screw with a threaded shank portion for extending through the first through aperture in the clamping band and anchoring in the first die member, and an enlarged head portion for engaging the first enlarged end portion of the clamping band in the clamped condition;
providing a second mounting screw with a threaded shank portion for extending through the second through aperture in the clamping band and anchoring in the first die member, and a tapered head portion with at least a portion thereof having an outside diameter that is greater than the second through aperture in the clamping band;
forming a first threaded retainer aperture in the first die member at a location thereon concentric with the first through aperture in the clamping band;
forming a second threaded retainer aperture in the first die member at a location thereon which in the unclamped condition is laterally offset from the second through aperture in the clamping band;
positioning the clamping band on the first die member with the medial portion thereof disposed generally over the blind hole pocket, and the first through aperture disposed generally over the first threaded retainer aperture in the first die member;
inserting the first mounting screw through the first through aperture in the clamping band and into the first threaded retainer aperture in the first die member, and rotating the same to a generally tightened condition;
inserting the body portion of the gas spring through the medial portion of the clamping band and into the blind hole pocket in the first die member;
inserting the second mounting screw through the second through aperture in the clamping band and into the second threaded retainer aperture in the first die member, and rotating the same to a loosely retained condition; and
tightening the second mounting screw in the second threaded retainer aperture of the first die member, thereby engaging the tapered head portion of the second mounting screw against the sidewall of the second through aperture, and shifting the second enlarged end portion of the clamping band laterally toward the first enlarged end portion of the clamping band and pulling the medial portion of the clamping band constrictingly against the gas spring body to securely, yet detachably retain the gas spring on the first die member in the clamped condition.

27. A method as set forth in claim 26, including:
forming the tapered head portion of the second mounting screw such that when the second mounting screw is loosely retained in the first die member, the clamping band assumes the unclamped condition in which the gas spring body can be freely inserted into and removed from the medial portion of the clamping band, and when the second mounting screw is tightly anchored in the first die member, the clamping band assumes the clamped condition in which the gas spring body is securely retained in the medial portion of the clamping band.

28. A method as set forth in claim 27, including:
forming the enlarged head portion of the first mounting screw in a tapered shape to automatically center the first through aperture in the clamping band over the first threaded retainer aperture in the first die member when the first mounting screw is tightened.

29. A method as set forth in claim 28, wherein:
said first and second mounting screws providing steps comprise selecting the first and second mounting screws in a substantially identical size and configuration.

30. A method as set forth in claim 29, wherein:
said clamping band forming step includes forming the medial portion of the clamping band with an inner marginal sidewall surface having a generally circular plan shape in said unclamped condition configured to closely receive the gas spring body therein, whereby when the second mounting screw is tightened to the clamped condition, the inner marginal sidewall of the medial portion abuttingly clamps constricting about at least portions of the circumference of the gas spring body to both center and securely, yet releasably, retain the same therein.

31. A method as set forth in claim 30, wherein:

said clamping band forming step comprises forming the medial portion of the clamping band with a resilient and elastically deformable construction, whereby in the clamped condition, the inner marginal sidewall of the clamping band assumes a non-circular plan shape defined by a plurality of circumferentially spaced apart contact surfaces abutting the gas spring body, and a plurality of non-contact surfaces disposed circumferentially in between the contact surfaces, whereby when the second mounting screw is tightened to the clamped condition, those portions of the clamping band associated with the non-contact surfaces resiliently tense longitudinally and draw the contact surfaces abuttingly against the gas spring body to resiliently and constrictingly clamp the same at the contact surfaces, thereby securely, yet releasably, retaining the gas spring body in the clamping band.

32. A method as set forth in claim 31, wherein:

said clamping band forming step comprises forming the medial portion of the clamping band with a plurality of contact pads protruding radially inwardly from the inner marginal sidewall, in a circumferentially spaced apart relationship to define the contact surfaces.

33. In a metal forming die of the type having at least one gas spring mounted between first and second reciprocating die members, the improvement of a gas spring retainer assembly, comprising:

a one-piece, clamping band having a generally U-shaped plan configuration with a central axis of symmetry, and defined by:

a generally arcuate medial portion disposed generally about said central axis of symmetry, shaped to receive a body portion of said gas spring therein, and configured for resilient shifting between clamped and unclamped conditions;

first and second enlarged end portions, having associated first and second through apertures oriented generally parallel with said central axis of symmetry and defined by first and second sidewalls shaped for attaching said clamping band to said first die member;

first and second mounting screws, each having a threaded shank portion extending through an associated one said first and second through apertures in said clamping band and anchored in said first die member, and an enlarged head portion;

first and second tapered plugs, each having central aperture in which said shank portion of an associated one of said first and second mounting screws is retained, and a tapered exterior wall with at least a portion thereof having an outside diameter that is equal to or greater than the diameter of the associated one of said first and second sidewalls of said first and second through apertures in said clamping band; and first and second threaded retainer apertures in said first die member disposed in said unclamped condition in a laterally offset relationship with the associated one of said first and second through aperture in said clamping band and anchoring said shank portion of said associated one of said first and second mounting screws therein, whereby tightening of said first and second mounting screws engages said enlarged head portions of said first and second mounting screws against said first and second tapered plugs and draws the same toward said first die member, which engages said tapered exterior walls of said first and second tapered plugs against said first and second sidewalls of said first and second through apertures in said clamping band and shifts said first and second enlarged end portions of said clamping band laterally toward one another, thereby pulling said medial portion of said clamping band constrictingly against said gas spring body to securely, yet detachably retain said gas spring on said first die member.

\* \* \* \* \*